United States Patent [19]
Chao

[11] Patent Number: 5,742,665
[45] Date of Patent: Apr. 21, 1998

[54] MULTIFUNCTION ADAPTIVE TELEPHONE LINE MEASUREMENT METHOD AND SYSTEM

[76] Inventor: Edmond S. Chao, 12003 Landing Way, Hollywood, Fla. 33026

[21] Appl. No.: 655,213

[22] Filed: Jun. 5, 1996

[51] Int. Cl.$^6$ .............................. H04M 1/24; H04M 3/08; H04M 3/22
[52] U.S. Cl. .................................................. 379/7; 379/35
[58] Field of Search .......................... 379/1, 6, 7, 34, 379/35, 164, 165, 377

[56] References Cited

U.S. PATENT DOCUMENTS

| | | | |
|---|---|---|---|
| 4,218,592 | 8/1980 | Steinbergs et al. | 379/7 |
| 4,634,813 | 1/1987 | Hensey | 379/6 |
| 4,658,099 | 4/1987 | Frazer | 379/7 |
| 4,680,783 | 7/1987 | Boeckmann | 379/6 |
| 4,760,592 | 7/1988 | Hensley | 379/7 |
| 5,073,919 | 12/1991 | Hagensick | 379/29 |
| 5,142,560 | 8/1992 | Neer | 379/7 |
| 5,553,116 | 9/1996 | Avni | 379/34 |

Primary Examiner—Curtis Kuntz
Assistant Examiner—Binh K. Tieu
Attorney, Agent, or Firm—Alvin S. Blum

[57] ABSTRACT

A system which monitors telephone lines includes the capability to detect abnormal line conditions of many varieties. Such detection capabilities include physical damage such as cut line, misuse such as leaving a handset off-hook for an extended period of time, and intentional abuse such as a wire tap. The system is flexible enough to automatically adjust to varying 'normal' conditions. As an aid in providing reliable telephone communications, the system will generate immediate alarms upon detection of abnormal conditions and concurrently create a historical database. This database is used to review reliability and response times, identify hardware failure trends or repeated misuse, and provide system management reports so as to adjust to varying normal conditions without generating false alarms. The physical system contains circuitry to scan the incoming telephone lines.

16 Claims, 3 Drawing Sheets

MULTIFUNCTION ADAPTIVE TELEPHONE LINE MEASUREMENT METHOD AND SYSTEM

BACKGROUND OF THE INVENTION

The present invention relates to a telephone line measurement method and apparatus, and more particularly relates to a telephone line monitoring system which automatically monitors the line electrical characteristic and radio frequency on the line so that the system is able to determine the telephone line condition and secure the line without being intercepted.

A telephone line consists of two wires, a tip (+) and a ring (−) wire coming from the Central Office (C.O.).

Telephone networks vary throughout the world. The DC line voltage in a telephone network is supplied by the C.O. battery. The C.O. source battery voltage supplied to an area may vary from one area to another. The line voltage may also be constantly changing.

In an ideal condition, a telephone set has three states which are the ONHOOK state, the OFFHOOK state, and RINGING state. The telephone line voltage is different for each state. In the ONHOOK state the phone line has 48+/−15% volts of Direct Current Voltage (48 VDC). In the OFFHOOK state the phone line has 5+/−15% volts of Direct Current Voltage (5 VDC). In the RINGING state the phone line has 130+/−15% volts of Alternating Current Voltage (130 VAC).

These are the US telecommunications standard. The phone line standard many vary from one country to another. It also may vary from one C.O. to another. When a handset is lifted off the hook, a switch connects the handset across the line. This puts an impedance (load) on the line, dropping the DC voltage. This low voltage signals the C.O. to generate a dial tone and activate the line.

How Wiretaps Work

"Wiretapping", the usually illegal listening in or recording of telephone conversation, is easily accomplished. The quickest and simplest method of wiretapping is to physically in parallel "tap-in" to the line by hard-wiring a telephone handset which is then used to listen in on the calls. Because the wired-in handset functions in the same manner as someone picking up an extension phone and listening, the mouthpiece of the handset is usually removed so the person being tapped cannot detect the wiretapper's breathing or other noise. A high-impedance coupling transformer is often used to feed the tapped signal into a tape recorder. Because a simple handset on the line would send an off hook signal to C.O., only a high impedance connection is made by the bug until the line is activated.

"Bugs"—The Wireless "Wiretap"

A wireless tap can be accomplished using a small transmitter commonly call a "bug". A bug requires very few electronic components and has a limited transmission range, usually 500–1000 feet, but will fit inside a phone and send a clear signal to a common FM radio operating 88–108 Mhz or 300–350 Mhz. The tiny FM transmitters are designed to operate directly from phone line power and transmit both sides of a telephone conversation. If it is impossible or impractical to enter the building to place the bug in the phone, the bug can be connected through a high-impedance to the phone line. Bugs that look like telephone mouthpieces are also commercially available; a wiretapper simple replaces the existing telephone mouthpiece with the transmitting version. A tape recorder can be coupled with the FM receiver to record the telephone conversation.

How "Bugs" Work

Telephone line DC voltage either directly, or through a resistor in series with the line current, is used to power a tunable voltage-controlled oscillator (VCO) that transmits a steady "carrier" signal within the FM broadcast band. The oscillator's frequency at any instant depends on the voltage applied. The telephone voice signal, which carries alternating voltage, is applied to the voltage powering the oscillator, thus causing the transmitted frequency to vary in exactly the same pattern as the voice frequency. This is "Frequency Modulation" that can be received by a common FM radio.

The "bug" being activated, puts an uncharacteristic DC voltage, Impedance, RF voltage on the line.

SUMMARY OF THE INVENTION

It is accordingly an object of the invention to provide a method of detecting a fault or an unauthorized surveillance device on one or more telephone lines incoming from at least one Central Office that operates on the line or lines without activating the Central Office. It is a further object that the method activate any surveillance device by applying a progressively diminishing resistance across the line but not so low as to activate the Central Office connection. It is yet another object that the method periodically, at preset time intervals, measure AC, DC, and RF voltage and impedance of the line or lines and compile therefrom running means and deviations for each measurement for each line and compare the current measurement to the compiled values and signal an alarm whenever a parameter exceeds a range of values derived from the running mean and deviation to thereby indicate a fault or surveillance device.

The apparatus of the invention includes AC, DC, RF voltage and impedance measuring devices, a storage or memory means for storing measurement values for the various parameters, switches for interconnecting the lines, the measuring devices and the storage means, and control means for controlling various devices and switches and for signaling that a fault or surveillance device has been detected.

The apparatus further includes means for applying progressively diminishing resistance across the line for activating any surveillance device and for impedance measurement. These and other object, advantages and features of the invention will become more apparent when the detected description is studied in conjunction with the drawings, in which like reference characters refer to like elements in the various figures.

DETAILED DESCRIPTION OF PREFERRED EMBODIMENT

Figure 1:
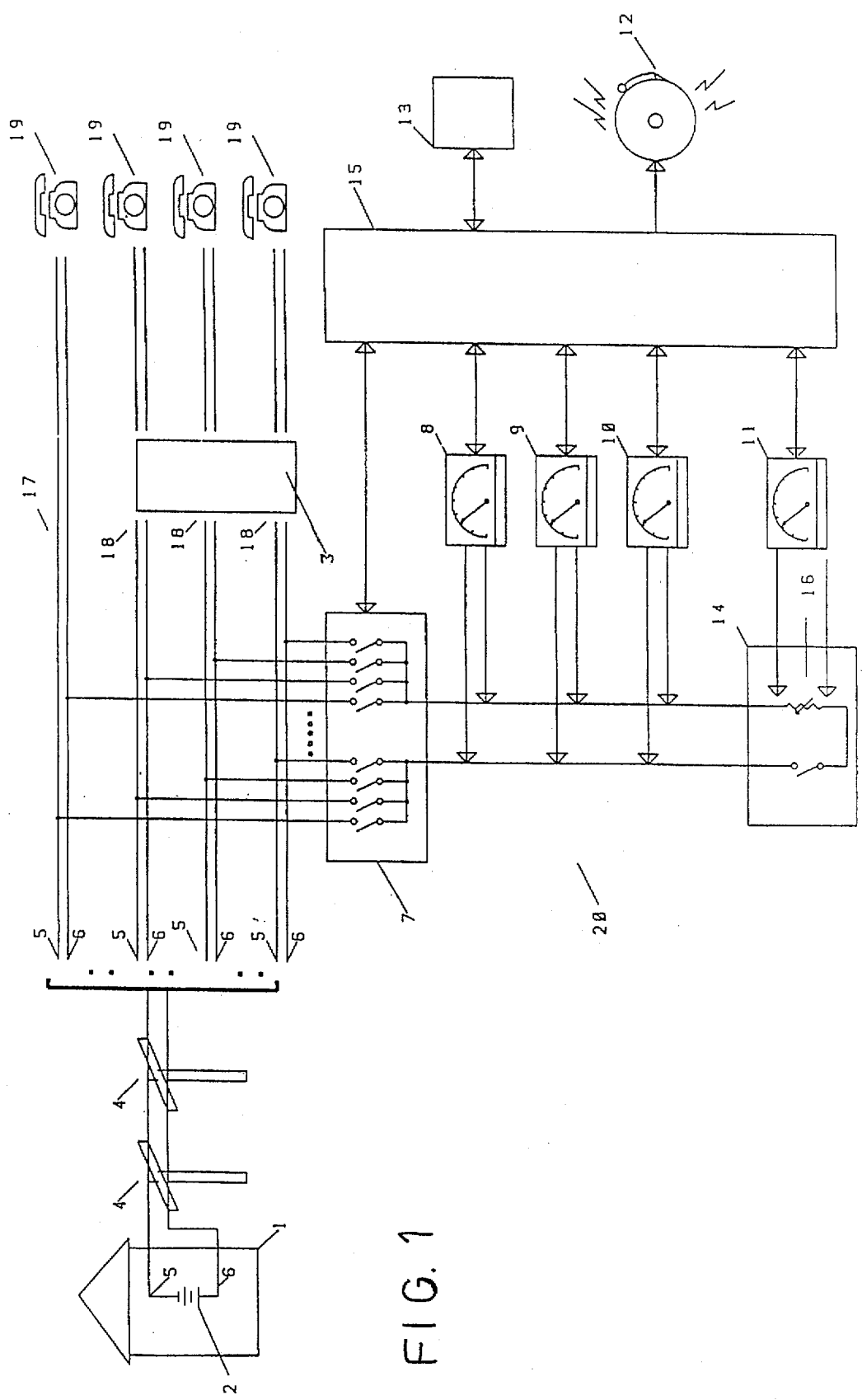
FIG. 1 is a diagrammatic illustration of a telephone system incorporating the invention on a direct line and through a PBX.

Referring now first to the apparatus shown in FIG. 1 a Central Office (1) has a battery (2) providing a DC voltage, positive to tip lines (5) and negative to ring lines (6). Telephone lines (4) from the Central Office are fed to various user sites, including the user site (20). As shown, a single telephone line (17) goes directly to a telephone (19). A plurality of lines (18) go through a PBX (3) to many telephones (19).

A switch mechanism (7) under operative control of controller (15) connects each line in turn to DC voltmeter (8), AC voltmeter (9), RF voltmeter (10) and impedance detector mechanism (11) which includes means (14) for applying diminishing resistance across a line.

The values for the various measured parameters are stored in the storage or memory (13) and the data manipulated by the controller which may be a small computer with a program therein.

The data are used to produce ranges of acceptable values and the controller compares measured values to acceptable rages and activates alarm signal (12) if values measured are found to the outside the range.

Figure 2:
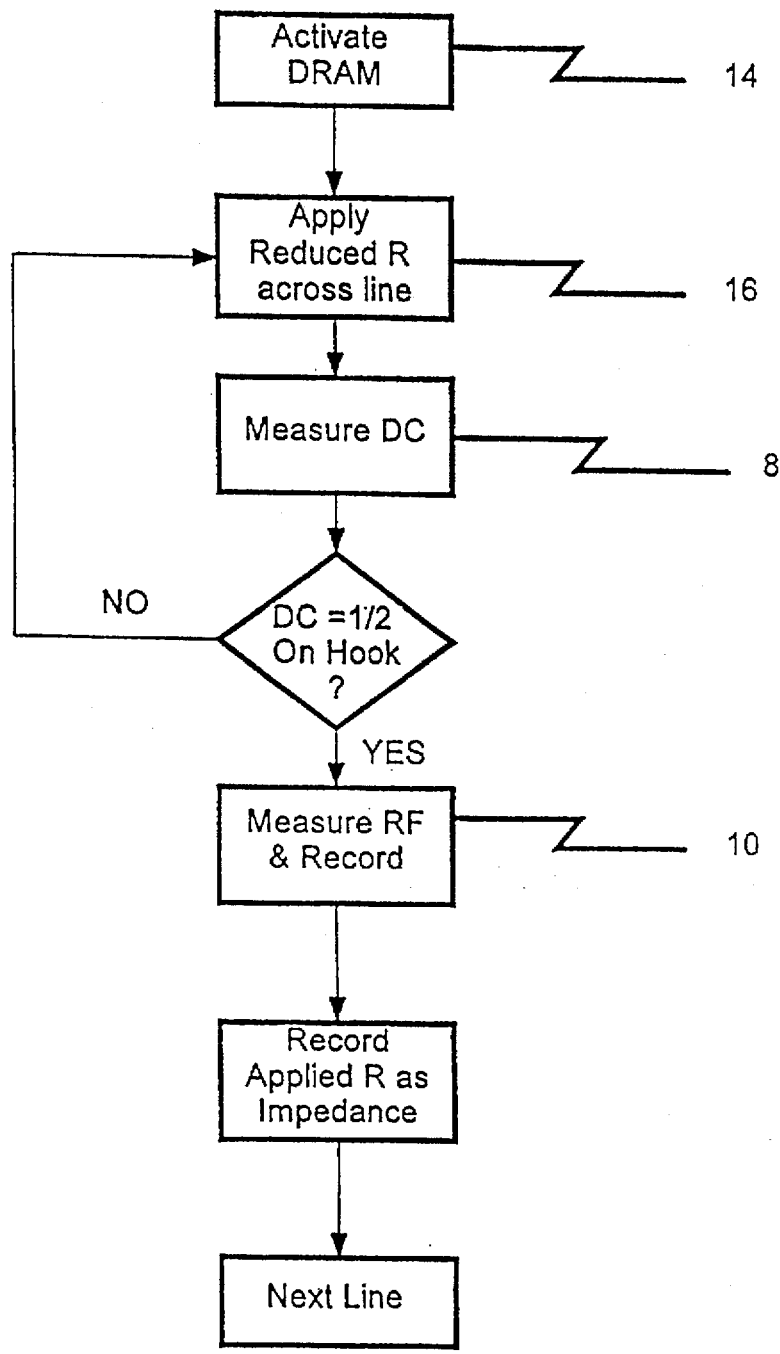
FIG. 2 is a flow chart of the impedance measurement and surveillance device activation method.

A method for activating hugs and detecting them by RF and impedance changes uses the method shown in the flow chart of FIG. 2 using the Diminishing Resistance Activation Method (DRAM) (14). Progressively diminishing resistances (16) are applied across the line while measuring DC voltage with DC voltmeter (8) until DC voltage is equal to or less than ½ the ONHOOK voltage. This voltage is enough to activate most bugs without activating the Central Office.

The RF voltage is measured by RF meter (10) and stored. The resistance R at this time is recorded as a measure of impedance. The impedance of the line is often altered by an activated bug. The RF voltage on the line is another indicator of an activated bug on the line.

Figure 3:
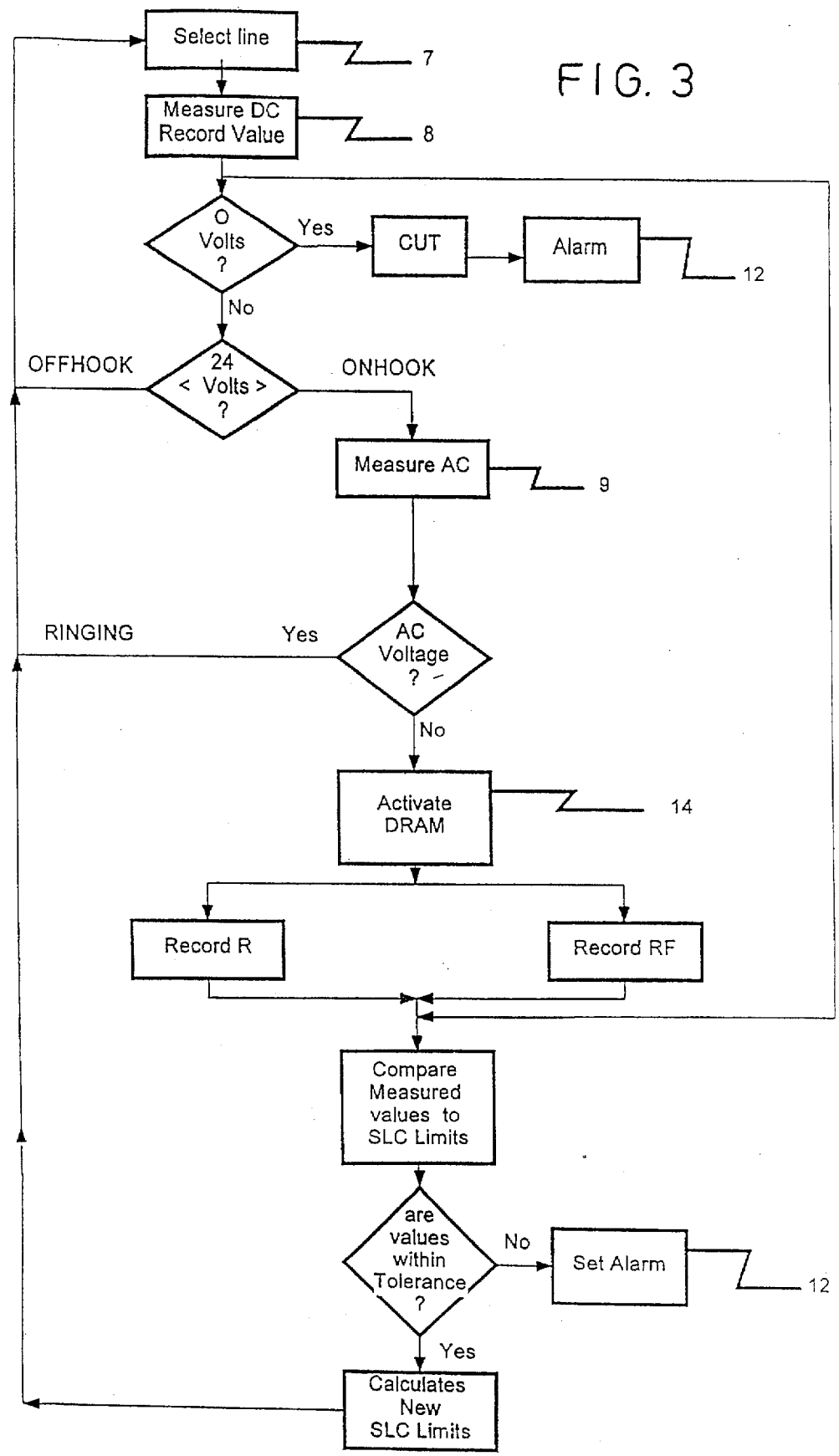
FIG. 3 is a flow chart of the method of the invention.

FIG. 3 illustrates the method of the invention in which faults and bugs are detected without interfering with operation of the line.

A line is selected by switch (7), DC voltage is measured by DC voltmeter (8). If zero volts is found it indicates the line is cut and alarm (12) signals the faults. If voltage is less than 24 volts or other preset voltage, the phone is OFF-HOOK and no measurements are taken. If ONHOOK, or greater than 24 volts, AC is measured with AC voltmeter (9), AC voltage on the line indicates RINGING and no measurements are taken. The DRAM process as shown in FIG. 2 is then activated and impedance R and RF are recorded at resistance that gives ½ ONHOOK voltage. The DC, R and RF values are compared to acceptable ranges. When during the evaluation algorithm process the values found for each parameter are evaluated against the control limits, if a value falls outside the control limits an alarm (12) is set and corrective action is indicated. This may include display of the nature of the problem.

If no value is outside the control limits the values for DC, R and RF are used to update the Statistical Line Control (SLC) limits and the next line is switched in for measurement. When multiple lines are connected to a single Central Office, values found on one line can also be compared with values found on other lines.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention

What is claimed is:

1. A method of detecting a fault or an unauthorized device on any of a plurality of telephone lines incoming from at least one Central Office, the method comprising the steps of:

repeatedly measuring RF voltage and at least one other parameter on each of the lines successively at predetermined time intervals, the at least one other parameter selected from the group consisting of DC voltage, AC voltage, and Impedance;

storing the parameter values measured;

calculating the mean and a measure of deviation for each parameter for each line and repeatedly recalculating the mean and deviation to provide a current mean and deviation to reflect slow progressive non fault drift in values;

comparing each new parameter value to the current mean and deviation; and providing an alarm signal whenever a new parameter value exceeds a range of values derived from the current mean and deviation to thereby indicate either that a fault or an unauthorized surveillance device is on the line.

2. The method according to claim 1, further comprising the steps of:

providing a progressively diminishing resistance across the line being tested to activate said device and measuring the progressively reduced DC voltage thereon to thereby detect, by a change in DC voltage, the presence of said device.

3. The method according to claim 1, further comprising the step of:

measuring the impedance of each telephone line by measuring the rate of drop of DC voltage after a resistance is applied across the line.

4. The method according to claim 1, further comprising the step of:

detecting the presence of the surveillance device by applying a progressively diminishing resistance across the line to activate the device without sending an OFF HOOK message to the Central Office.

5. The method according to claim 1, further comprising the steps of:

comparing the parameter values of a first line from a first Central Office with the parameter values of a second line from the first Central Office and providing an alarm signal whenever the difference therebetween exceeds preset limits.

6. Apparatus for automatically detecting a fault or an unauthorized surveillance device on any one of a plurality of telephone lines incoming from at least one Central Office, the apparatus comprising:

measuring means for measuring on a telephone line RF voltage and at least one other parameter selected from the group consisting of DC voltage, AC voltage, and Impedance;

switching means connected to the plurality of telephone lines for selectively connecting the measuring means to any one of the plurality of lines at any one time;

storage means for storing values of the parameters measured by the measuring means on the lines;

means for signaling evidence of a fault or surveillance device; and control means interconnecting the switching means, the measuring means, the storage means, and the signaling means, the control means for causing the switching means to connect the measuring means to each of the lines in turn repetitively at preset time intervals for storing the values of the parameters measured by the measuring means in the storage means, for determining from the stored values a running range of values to be expected by normal variance for each parameter for each line by statistical means, for determining whether the current measured value exceeds that range, and for actuating the signalling means when that range has been found to be exceeded.

7. The apparatus according to claim 6, in which the measuring means includes means for applying progressively diminishing resistance across the line to activate the surveillance device while measuring parameters effected by device activation, without sending an OFFHOOK message to the Central Office.

8. The apparatus according to claim 6, in which the control means further comprises means for comparing the parameter values of a first line from a first Central Office with the parameter values of a second line from the first Central Office and for providing an alarm signal for activating the signaling means whenever the difference therebetween exceeds preset limits.

9. A method of detecting a fault or an unauthorized surveillance device on a telephone line incoming from a Central Office, the method comprising the steps of:

repeatedly measuring RF voltage and at least one other parameter on the line successively at predetermined time intervals, the at least one other parameter selected from the group consisting of DC voltage, AC voltage, and Impedance;

storing the parameter values measured;

calculating the mean and a measure of the deviation for each parameter for the line and repeatedly recalculating the mean and deviation to provide a current mean and deviation to reflect slow progressive non fault drift in values;

comparing each new parameter value to the current mean and deviation; and providing an alarm signal whenever a new parameter value exceeds a range of values derived from the current mean and deviation to thereby indicate either that a fault or an unauthorized surveillance device is on the line.

10. The method according to claim 9, further comprising the steps of:

providing a progressively diminishing resistance across the line being tested to activate said device, and measuring the progressively reduced DC voltage thereon to thereby detect, by a change in DC voltage, the presence of said device.

11. The method according to claim 9, further comprising the step of:

measuring the impedance of the telephone line by measuring the rate of drop of DC voltage after a resistance is applied across the line.

12. The method according to claim 9, further comprising the step of:

detecting the presence of the surveillance device by applying a progressively diminishing resistance across the line to activate the device while measuring parameters effected by device activation, without sending an OFFHOOK message to the Central Office.

13. Apparatus for automatically detecting a fault or an unauthorized surveillance device on a telephone line incoming from a Central Office, the apparatus comprising:

measuring means for measuring on a telephone line RF voltage and at least one other parameter selected from the group consisting of DC voltage, AC voltage, and Impedance;

storage means for storing values of the parameters measured by the measuring means on the line;

means for signaling evidence of a fault or surveillance device; and control means interconnecting the measuring means, the storage means, and the signaling means, the control means for causing the measuring means to measure the line repetitively at preset time intervals, for storing the values of the parameters measured by the measuring means in the storage means, for determining from the stored values a running range of values to be expected by normal variance for each parameter for the line by statistical means, for determining whether the current measured value exceeds that range, and for actuating the signalling means when that range has been found to be exceeded.

14. The apparatus according to claim 13, in which the measuring means includes means for applying progressively diminishing resistance across the line to activate the surveillance device while measuring parameters effected by device activation, without sending an OFFHOOK message to the Central Office.

15. A method of detecting a fault or an unauthorized device on any of a plurality of telephone lines incoming from at least one Central Office, the method comprising the steps of:

repeatedly measuring, on each of the lines successively, at predetermined intervals, current values of parameters comprising: RF voltage; DC voltage; AC voltage; and Impedance;

storing the parameter values measured;

calculating a measure of central tendency and a measure of deviation for each parameter for each line and repeatedly recalculating the measure of central tendency and deviation to provide a current measure of central tendency and deviation to reflect slow progressive non fault drift in values;

comparing each new parameter value to the current measure of central tendency and deviation;

providing an alarm signal whenever a new parameter value exceeds a range of values derived from the current measure of central tendency and deviation to thereby indicate either that a fault or an unauthorized surveillance device is on the line; and providing a progressively diminishing resistance across the line being tested to activate said device and measuring the progressively reduced DC voltage thereon to thereby detect, by a change in DC voltage, the presence of said device.

16. Apparatus for automatically detecting a fault or an unauthorized surveillance device on any one of a plurality of telephone lines incoming from at least one Central Office, the apparatus comprising:

measuring means for measuring, on a telephone line, current values of parameters comprising: RF voltage; DC voltage; AC voltage; and Impedance;

switching means connected to the plurality of telephone lines for selectively connecting the measuring means to any one of the plurality of lines at any one time;

storage means for storing values of the parameters measured by the measuring means on the lines;

means for signalling evidence of a fault or surveillance device;

control means interconnecting the switching means, the measuring means, the storage means, and the signalling means, the control means for causing the switching means to connect the measuring means to each of the lines in turn repetitively at preset time intervals for storing the values of the parameters measured by the measuring means in the storage means, for determining from the stored values a running range of values to be expected by normal variance for each parameter for each line by statistical means, for determining whether the current measured value exceeds that range, and for actuating the signalling means when that range has been found to be exceeded; and means for applying progressively diminishing resistance across the line to activate the surveillance device while measuring parameters effected by device activation, without sending an OFFHOOK message to the Central Office.

* * * * *